3,000,127
FISHERMEN'S TOOL
Wilson Stegeman, 2727 Montecito Road,
Santa Rosa, Calif.
Filed Jan. 26, 1959, Ser. No. 788,953
2 Claims. (Cl. 43—1)

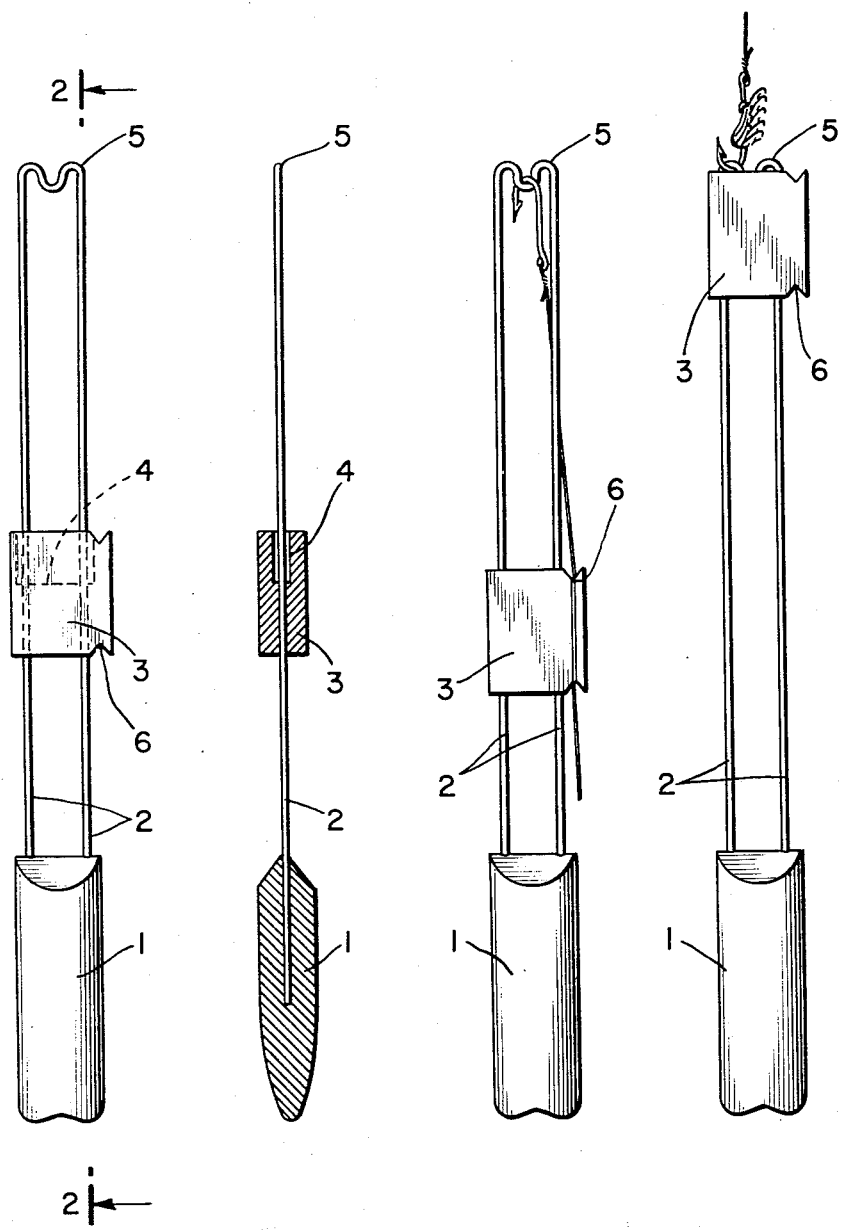

This invention relates to a convenient and novel device which can be used by fishermen, more particularly, by a fisherman who has hooked and captured a fish.

One object of this invention is to provide a handy device for killing a fish which has been hooked, either before or after the fish has been disengaged from the hook.

Another object is to provide a convenient and easy means for disengaging the hook from the fish's mouth.

A further object is to provide a convenient means of holding the disengaged hook, in order to examine, adjust, or change it without holding it between the thumb and fingers of one hand, thus making the entire hook accessible, no matter how small. This latter use is particularly valuable to dry-fly fishermen, who generally wish to wash, dry, examine and re-dress the fly after it has been hooked in the fish's mouth.

Still a further object is to provide a convenient small fly-vise, for those fly fishermen who may want to tie a new or different fly while fishing, to suit a particular need or situation.

The above requirements are frequently met by various means which may accomplish one or more of the above objects, but my device combines the means for carrying out all of these objects into one small convenient tool.

For a better understanding of my invention, reference should be had to the accompanying drawing, forming part of this application, in which:

FIG. 1 is a plan view of the combination tool.
FIG. 2 is a sectional view taken on line 2—2 of FIG. 1.
FIG. 3 shows the tool in use as a hook disengager (or disgorger, as it is commonly called).
FIG. 4 shows the tool being used to hold the hook, for its examination, repair, manipulation, or change.

As will be apparent from the drawings a weight 1 is attached to a resilient shank 2. This resilient handle may be constructed of spring wire or some other suitable material which would enable the operator to use the shank as a handle to deal a sharp blow to the fish with a minimum of effort. Attached to the shank and so constructed as to slide along it, is a block of material 3 which when slipped down to the end of the shank forms a convenient grip for the operator's hand in striking the fish with the weighted end.

When the grip has been slipped along to the end of the shank, a recess 4 in the end of it covers the end of the shank so that it does not project beyond the block. The end of the shank is formed with, or contains a bifurcation 5 which, when uncovered, forms the means for disengaging the hook from the fish's mouth.

The sliding grip may be made of semi-resilient material so that the recess walls are elastic enough to firmly hold the hook when the bend of the hook is engaged in the bifurcation at the end of the shank and the grip is pushed partially down around it, thus firmly holding the hook for adjustment, repair, or changing. This avoids the need for holding a small hook in the fingers of one hand while attempting to manipulate or change it with the other hand, which is frequently a difficult maneuver due to the smallness of the hook and the difficulty of holding it between the fingers, particularly on a cold day. Furthermore, a fly attached to the hook makes it very susceptible to being blown away in the wind, once the grip on it is inadvertently relaxed. Holding the hook, therefore, performs a very real service to the fisherman. This use is well shown in FIG. 4.

The grip is further supplied with two notches 6 into which the line or leader may be wrapped and secured before attempting to disengage the hook from the fish's mouth. The secured, taut leader thus forms a guide, or "trolley" down which the bifurcated end of the shank is easily guided to the bend of the hook, for disengaging it from the fish's mouth.

There are occasions during which a fly fisherman may wish to tie or change a fly to suit a particular situation which he encounters on the stream. FIG. 4 illustrates how the tool may be used as a fly vise, to assist the fisherman in this endeavor. When doing this, the spring shank can be spread and clamped over a small limb and the other end of the tool anchored with a jackknife, or in some other manner.

Having now described my combination tool and its uses, I claim the following:

1. A fisherman's tool comprising a shank of resilient material, a handle fixedly secured to one end of said shank, the other end of said shank being formed with furcations between which a fish hook may be engaged, a grip-member of resilient material slidably mounted on said shank, said grip-member having a recess in one end thereby providing resilient walls to partially surround and hold a fish hook received by the bifurcated end of the shank when the grip-member is slid to that end of the shank, and said grip-member having a pair of notches to receive a line to be wrapped on the grip-member.

2. A fisherman's tool as in claim 1 wherein said shank comprises a spring wire bent upon itself to provide a pair of parallel legs and said grip-member includes a pair of parallel holes to receive said legs for relative sliding movement therebetween.

References Cited in the file of this patent
UNITED STATES PATENTS

| | | |
|---|---|---|
| 889,901 | Bush | June 9, 1908 |
| 1,322,826 | Ryerson | Nov. 25, 1919 |
| 2,707,325 | Cripps | May 3, 1955 |
| 2,724,207 | Miller et al. | Nov. 22, 1955 |
| 2,809,684 | Lyon | Oct. 15, 1957 |